(12) United States Patent
Agenet

(10) Patent No.: US 9,410,424 B2
(45) Date of Patent: Aug. 9, 2016

(54) TRACERS FOR THE STUDY OF AN OIL RESERVOIR IN HIGH SALINITY AND HIGH TEMPERATURE CONDITIONS

(71) Applicant: TOTAL SA, Courbevoie (FR)

(72) Inventor: Nicolas Agenet, Bonnut (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 14/652,044

(22) PCT Filed: Dec. 10, 2013

(86) PCT No.: PCT/EP2013/076125
§ 371 (c)(1),
(2) Date: Jun. 12, 2015

(87) PCT Pub. No.: WO2014/090823
PCT Pub. Date: Jun. 19, 2014

(65) Prior Publication Data
US 2015/0315907 A1    Nov. 5, 2015

(30) Foreign Application Priority Data

Dec. 14, 2012  (EP) .................... 12306592

(51) Int. Cl.
*E21B 49/00* (2006.01)
*E21B 49/08* (2006.01)
*C09K 8/035* (2006.01)
*G01N 33/24* (2006.01)

(52) U.S. Cl.
CPC ............. *E21B 49/08* (2013.01); *C09K 8/035* (2013.01); *E21B 49/00* (2013.01)

(58) Field of Classification Search
CPC ........... C09K 8/035; E21B 49/00; E21B 49/08
See application file for complete search history.

(56) References Cited

U.S. PATENT DOCUMENTS

| | | | | |
|---|---|---|---|---|
| 3,623,842 | A | * 11/1971 | Deans et al. | ......... G01N 33/241 166/252.2 |
| 3,990,298 | A | 11/1976 | Deans | |
| 4,168,746 | A | 9/1979 | Sheely | |
| 4,782,899 | A | * 11/1988 | Richardson | ............. E21B 49/00 166/252.2 |
| 6,321,595 | B1 | 11/2001 | Pope et al. | |

OTHER PUBLICATIONS

Harry A. Deans et al., Bartlesville Project Office, U.S. Department of Energy, Bartlesville, Oklahoma, Fossil Energy, "The Single-Well Chemical Tracer Method of Measuring Residual Oil Saturation", published Oct. 1980, 128 pages.
PCT International Search Report and Written Opinion for PCT/EP2013/076125, mailed Mar. 7, 2014, 8 pgs.

* cited by examiner

*Primary Examiner* — Jennifer Wecker
(74) *Attorney, Agent, or Firm* — Patterson Thuente Pedersen, P.A.

(57) ABSTRACT

The invention relates to the use of a compound of the general formula (I), wherein A represents an alkanediyl radical having 2 to 4 carbon atoms, which may be substituted by one or more methyl and/or ethyl groups, and either R represents a linear or branched $C_1$ to $C_4$ alkyl group and R' represents a hydrogen atom, or R and R' are linked together to form a cycle, and the —R—R'— radical represents —CO—, as a tracer for use in a Single-Well Chemical Tracer Test, to determine the Residual Oil Saturation in oil reservoirs.

8 Claims, No Drawings

TRACERS FOR THE STUDY OF AN OIL RESERVOIR IN HIGH SALINITY AND HIGH TEMPERATURE CONDITIONS

RELATED APPLICATIONS

The present application is a National Phase entry of PCT Application No. PCT/EP2013/076125, filed Dec. 10, 2013, which claims priority from EP Patent Application No. 12306592.2, filed Dec. 14, 2012, said applications being hereby incorporated by reference herein in their entirety.

FIELD OF THE INVENTION

The present invention relates to the exploration and exploitation of oil reservoirs. More specifically, this invention relates to the use of new tracers in Single-Well Chemical Tracer Tests, to determine the Residual Oil Saturation in oil reservoirs.

BACKGROUND OF THE INVENTION

The Single-Well Chemical Tracers Test (SWCTT) is a method well known in the art useful for measuring fluid saturations in oil reservoirs, for instance Residual Oil Saturation ($S_{OR}$). The Residual Oil Saturation is a value representing the quantity of oil that remains in an oil reservoir at depletion. Knowing the Residual Oil Saturation of an oil reservoir may be important if one wants to carry out, for example, an Enhanced Oil Recovery method.

SWCTT has been disclosed in the U.S. Pat. No. 3,623,842. The principle of this method is based on the distribution of tracer molecules locally according to an equilibrium relationship between pockets of trapped oil and flowing water. The test method consists in injecting to the oil reservoir an aqueous solution containing a tracer. Said tracer is capable of reacting in the reservoir in order to form a secondary tracer, said first tracer and said secondary tracer having different partition coefficients between oil and water. The tracer solution is thus left in the reservoir for a reaction period. After that, the well is produced, and the returning water is analyzed. Because of the difference between the partition coefficient of the first tracer and the partition coefficient of the secondary tracer, both tracers do not reappear at the same time in the returning water. The Residual Oil Saturation $S_{OR}$ may be calculated from the separation between the first tracer and the secondary tracer in the returning water.

Since this first disclosure, SWCTTs have been run in several fields, and some improvements have been disclosed. For example, the U.S. Pat. No. 4,168,746 and U.S. Pat. No. 6,321,595 disclose the injection of several tracers in the oil reservoir. A thorough report performed by the U.S. Department of Energy (DOE), entitled "Fossil energy, The Single-Well Chemical Tracer Method of Measuring Residual Oil Saturation", published in October 1980, downloadable from internet, discloses the technique of the SWCTT. All these documents disclose the use of ester compounds as chemical tracers. During the reaction period, the ester tracers dissolved in water in the oil reservoir are hydrolyzed to form alcohol and acid compounds. The alcohol compounds are the secondary tracers which may be analyzed in the returning water.

Even if this test method has demonstrated its efficiency in several real situations, the SWCTT method cannot be implemented efficiently with oil reservoirs having high salinity and/or high temperature conditions. Indeed, the selection of a suitable tracer is dictated at least by two criteria: the partition coefficient of the tracer between oil and water phase ($K_d$) and the hydrolysis rate of the tracer ($k_H$). The tracer is selected such that its $K_d$ and $k_H$ values are close to the optimal values of $K_d$ and $k_H$, which may be determined as disclosed in the DOE report. However, first, the conditions of salinity and of temperature of the well have an effect on the partition coefficient $K_d$ of the tracer between oil and water phase. If the salinity of the reservoir is high, the partition coefficient $K_d$ of the tracer will generally be higher than the optimal partition coefficient. Secondly, high temperature increases dramatically the hydrolysis of the tracers. If the temperature of the reservoir is high, the hydrolysis rate $k_H$ of the tracer will generally be higher than the optimal hydrolysis rate.

Consequently, the test methods currently used are not satisfactory for testing oil reservoirs in high salinity and/or high temperature conditions. The currently used tracers are not suitable for these specific conditions. If they were used, the precision of the measures would not be optimal.

In this context, one object of the present invention is to provide an improved test method which would be efficient in high salinity and/or high temperature conditions. This method may advantageously remedy the drawbacks of tracers according to the prior art. In addition, the method may advantageously use tracers which are economical and harmless. Furthermore, the test method of the invention may be advantageously simple to implement and economical.

SUMMARY OF THE INVENTION

These objectives, amongst others, are achieved by the invention which relates first to a method for measuring the Residual Oil Saturation in an oil reservoir, comprising the steps of:

injecting a tracer fluid into said oil reservoir;

shutting in the oil reservoir during a reaction period; and collecting the tracer fluid back after the reaction period, and analyzing it to deduce therefrom the value of the Residual Oil Saturation in said oil reservoir, wherein the injected tracer fluid contains at least one tracer of the general formula (I):

R—O-A-O—R'  (I)

wherein A represents an alkanediyl radical having 2 to 4 carbon atoms, which may be substituted by one or more methyl and/or ethyl groups, and either R represents a linear or branched $C_1$ to $C_4$ alkyl group and R' represents a hydrogen atom, or R and R' are linked together to form a cycle, and the —R—R'— radical represents —CO—.

The invention also relates to the use of a compound of the general formula (I):

R—O-A-O—R'  (I)

wherein A represents an alkanediyl radical having 2 to 4 carbon atoms, which may be substituted by one or more methyl and/or ethyl groups, and either R represents a linear or branched $C_1$ to $C_4$ alkyl group and R' represents a hydrogen atom, or R and R' are linked together to form a cycle, and the —R—R'— radical represents —CO—, as a tracer for use in a Single-Well Chemical Tracer Test, to determine the Residual Oil Saturation in oil reservoirs.

DETAILED DESCRIPTION OF THE INVENTION

According to the present invention, the injected tracer fluid contains at least one tracer of the general formula (I):

R—O-A-O—R'  (I)

wherein A represents an alkanediyl radical having 2 to 4 carbon atoms, which may be substituted by one or more methyl and/or ethyl groups,
and
either R represents a linear or branched $C_1$ to $C_4$ alkyl group and R' represents a hydrogen atom,
or R and R' are linked together to form a cycle, and the —R—R'— radical represents —CO—.

In the present application, the expression "alkanediyl radical" means a bivalent alkane group. Consequently, an alkanediyl radical having 2 to 4 carbon atoms is a bivalent radical selected from the group consisting of ethanediyl (—$CH_2$—$CH_2$—), propanediyl (—$CH_2$—$CH_2$—$CH_2$—) and butanediyl (—$CH_2$—$CH_2$—$CH_2$—$CH_2$—).

A may represent an alkanediyl radical having 2 to 4 carbon atoms, which is unsubstituted. Alternatively, A may represent an alkanediyl radical having 2 to 4 carbon atoms, which is substituted by one or two methyl and/or ethyl groups.

According to a preferred embodiment of the invention, A represents ethanediyl, which may be substituted by one or more methyl and/or ethyl groups. More preferably, A represents ethanediyl which is not substituted, or which is monosubstituted by a methyl group. Therefore, the tracer of the invention may be selected from the group consisting in the compounds of formula (Ia) or (Ib):

(Ia)

(Ib)

wherein R and R' are as defined above.

In a first alternative, R represents a linear or branched $C_1$ to $C_4$ alkyl group and R' represents a hydrogen atom. The tracer may thus be selected from the group consisting in the compounds of the formula (II):

R—O-A-OH  (II)

wherein A is as defined above, and R represents a linear or branched $C_1$ to $C_4$ alkyl group.

According to this alternative, the tracers are ether compounds. Preferably, the tracer may be an ether of ethylene or propylene glycol. The tracer may be selected from the group consisting in the compounds of the formula (IIa) or (IIb):

(IIa)

(IIb)

wherein R is as defined above.

Preferably, R is selected from the group consisting of ethyl, n-propyl, iso-propyl, n-butyl and tert-butyl. More preferably, R is selected from the group consisting of n-propyl and n-butyl. The tracer may be selected from the group consisting of ethylene glycol butyl ether (EGBA),

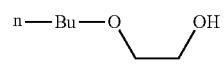

ethylene glycol propyl ether

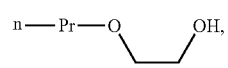

and propylene glycol propyl ether

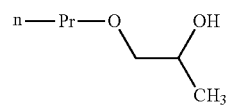

In a second alternative, R and R' are linked together to form a cycle, and the —R—R'— radical represents —CO—. The tracer may thus be selected from the group consisting in the compounds of the formula (III):

(III)

wherein A is as defined above. According to this alternative, the tracers are carbonate compounds.

Preferably, the tracer may be propylene glycol carbonate or ethylene glycol carbonate. The tracer may be selected from the group consisting in the compounds of the formula (IIIa) or (IIIb):

(IIIa)

(IIIb)

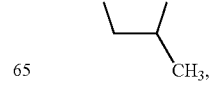

To the best of the knowledge of the inventors, these types of compounds have never been disclosed as tracer in SWCTT methods. None of these compounds contains an ester function. Therefore, the reactivity of the tracers of the invention is different from the reactivity of the ester tracers disclosed in prior art. The tracers according to the invention may undergo a hydrolysis during a reaction period, and the obtained product may be of the general formula (IV):

$$HO-A-OH \qquad (IV)$$

wherein A is as defined above. The obtained product is capable of being used as a secondary tracer.

The inventors have discovered that the compounds according to the invention are particularly useful as tracers in SWCTT method, and they may advantageously replace the ester compounds which are traditionally used. More specifically, these compounds are useful when the SWCTT method is carried out in high salinity and/or high temperature conditions. Indeed, the inventors have discovered that the compounds according to the invention have a partition coefficient $K_d$ and a hydrolysis rate $k_H$ which are close to the $K_d$ and $k_H$ optimal parameters which may be determined for tests in high salinity and/or high temperature conditions.

In addition to that, the compounds according to the invention are commercially available in high amounts and are cost effective. Moreover, the compounds and the compounds obtainable after hydrolysis are harmless. They may be analyzed easily by known chromatographic techniques. The use of said compounds as tracers instead of ester does not necessitate the modification of the SWCTT method.

The invention relates to a method for measuring the Residual Oil Saturation in an oil reservoir, wherein the compounds disclosed above are used as tracer. The method comprises the steps of:

injecting a tracer fluid into said oil reservoir;
shutting in the oil reservoir during a reaction period; and
collecting the tracer fluid back after the reaction period, and analyzing it to deduce therefrom the value of the Residual Oil Saturation in said oil reservoir.

All these steps are classically known by the person skilled in the art for measuring Residual oil Saturation in an oil reservoir. Detailed explanations on how to carry out the method for measuring Residual Oil Saturation may be found for instance in the report performed by the U.S. Department of Energy (DOE), entitled "Fossil energy, The Single-Well Chemical Tracer Method of Measuring Residual Oil Saturation", published in October 1980.

A tracer fluid, which is injected into the oil reservoir, comprises the tracer compound. The tracer fluid may be an aqueous fluid, and preferably, the water used may be water from the oil reservoir. This insures compatibility with the porous medium of the oil reservoir, and avoids salinity contrast between injected and native water. The concentration of tracer in the tracer fluid and the volume of tracer fluid injected into the oil reservoir may be selected by the person skilled in the art according to the specification of the oil reservoir. Typically, the concentration of tracer in the tracer fluid may be comprised between 0.1 vol. % and 1 vol. %. The tracer fluid may comprise one tracer according to the invention, or several different tracers according to the invention. In addition, the tracer fluid may comprise a mixture of tracer(s) according to the invention and tracer(s) according to the prior art.

The shut-in step is designed to allow the injected tracer to react. The reaction period may be selected by the person skilled in the art to obtain an optimal conversion rate.

During the collection step, the tracer fluid, containing the initial unreacted tracer and reacted tracer, is collected back from the oil reservoir. According to a preferred embodiment of the invention, the injection and the collection steps are performed in the same well, by inversion of the flow of the injected fluid. The method according to the invention may thus be a Single-Well Chemical Tracer Test (SWCTT) method. Alternatively, the injection step and the collection step may be performed in two separate wells.

Typically, the analysis of the returning tracer fluid may be carried out by chromatography. The concentration of the initial unreacted tracer and of the reacted tracer is measured in function of the volume of collected fluid. A separation between the initial unreacted tracer and the reacted tracer may typically be observed. It may be the basis for the determination of the Residual Oil Saturation in the oil reservoir.

The method of the present invention is particularly advantageous in high salinity and/or high temperature conditions. Therefore, according to a preferred embodiment of the invention, the temperature in said oil reservoir is higher than 80° C., preferably between 80° C. and 150° C. and more preferably between 80° C. and 120° C. In addition or alternatively, the salinity in said oil reservoir is higher than 100 000 ppm, preferably between 100 000 ppm and 300 000 ppm, and more preferably between 110 000 ppm and 250 000 ppm. In the present application, the salinity is expressed in ppm TDS, which means "parts per million of Total Dissolved Solids".

The method of the invention makes it possible to obtain information about the Residual Oil Saturation $S_{OR}$ in an oil reservoir. In particular, said method makes it possible to measure a Residual Oil Saturation in the range of 10% to 30%, which is a typical range, with a high precision.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for measuring Residual Oil Saturation in an oil reservoir, comprising the steps of:
injecting a tracer fluid into said oil reservoir;
shutting in the oil reservoir during a reaction period; and
collecting the tracer fluid back after the reaction period, and analyzing the injected tracer fluid to deduce therefrom the value of the Residual Oil Saturation in said oil reservoir, wherein the injected tracer fluid contains at least one tracer of the general formula (I):

$$R-O-A-O-R' \qquad (I)$$

wherein A represents an alkanediyl radical having 2 to 4 carbon atoms, which may be substituted by one or more methyl and/or ethyl groups,
and
　either R represents a linear or branched $C_1$ to $C_4$ alkyl group and R' represents a hydrogen atom,
　or R and R' are linked together to form a cycle, and the —R—R'— radical represents —CO—.

2. The method according to claim 1, wherein the tracer is selected from the group consisting of the compounds of the formula (II):

$$R\text{—}O\text{-}A\text{-}OH \tag{II}$$

wherein A is as defined above, and R represents a linear or branched $C_1$ to $C_4$ alkyl group.

3. The method according to claim 2, wherein the tracer is an ether of ethylene or propylene glycol.

4. The method according to claim 3, wherein the tracer is selected from the group consisting of ethylene glycol butyl ether, ethylene glycol propyl ether and propylene glycol propyl ether.

5. The method according to claim 1, wherein the tracer is selected from the group consisting of the compounds of the formula (III):

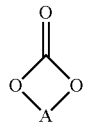
(III)

wherein A represents an alkanediyl radical having 2 to 4 carbon atoms, which may be substituted by one or more methyl and/or ethyl groups.

6. The method according to claim 5, wherein the tracer is propylene glycol carbonate or ethylene glycol carbonate.

7. The method according to claim 1, wherein the temperature in said oil reservoir is higher than 80° C., preferably between 80° C. and 150° C. and more preferably between 80° C. and 120° C.

8. The method according to claim 1, wherein the salinity in said oil reservoir is higher than 100 000 ppm, preferably between 100 000 ppm and 300 000 ppm, and more preferably between 110 000 ppm and 250 000 ppm.

\* \* \* \* \*